UNITED STATES PATENT OFFICE.

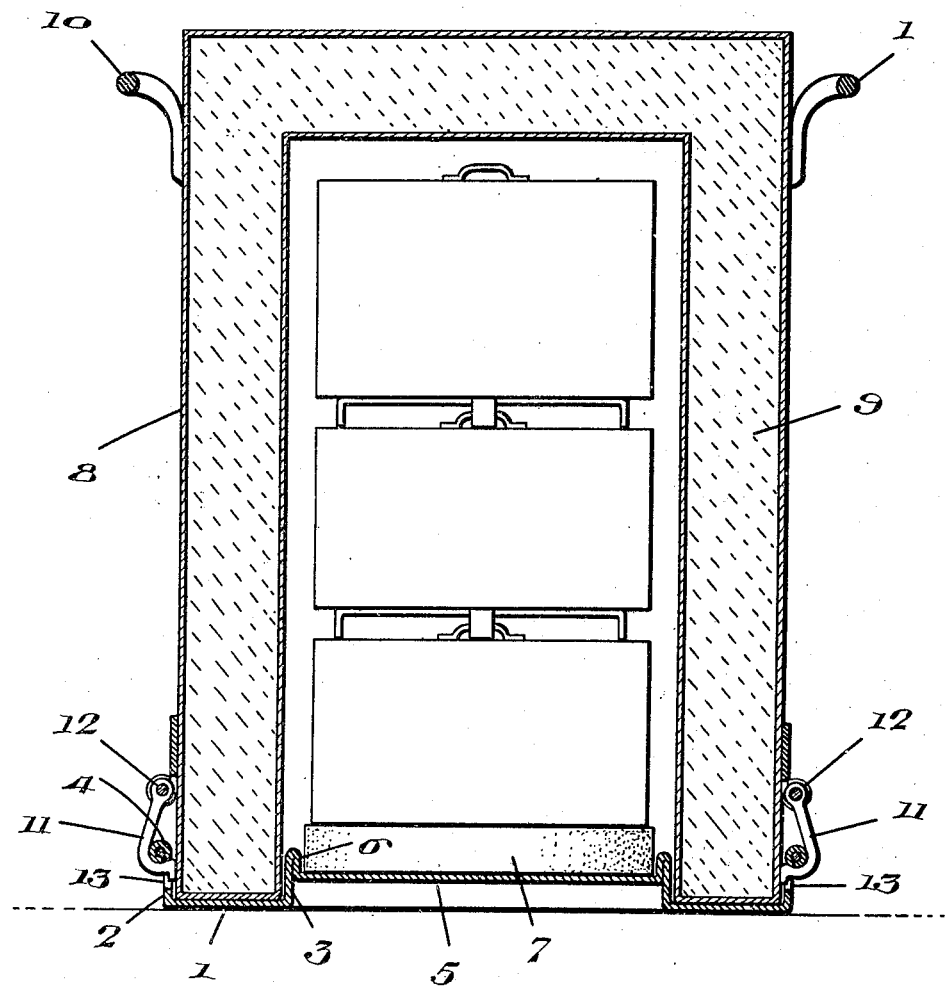

JOHN L. SNIDER, OF DENTON, NORTH CAROLINA, ASSIGNOR TO ROYAL METALWARE MANUFACTURING CO., OF DENTON, NORTH CAROLINA, A CORPORATION OF NORTH CAROLINA.

FIRELESS COOKER.

1,328,304.  Specification of Letters Patent.  Patented Jan. 20, 1920.

Application filed June 12, 1919. Serial No. 303,619.

*To all whom it may concern:*

Be it known that I, JOHN L. SNIDER, a citizen of the United States, residing at Denton, in the county of Davidson and State of North Carolina, have invented certain new and useful Improvements in Fireless Cookers; and I do hereby declare the following to be a full, clear, and exact description of the invention, such as will enable others skilled in the art to which it appertains to make and use the same.

The present invention relates to fireless cookers, such as use a heat radiator within an inclosed insulated casing, and it is the primary object of the invention to provide such a device of simple construction, which can be cheaply manufactured, and which will also be thoroughly efficient, convenient, safe and practical in use.

Another object of the invention is the provision of a novel base having means for receiving the lower open end of a bell shaped hood, and means for supporting the radiator within the hood, and means for clamping the hood down on the base in an effective manner.

A still further object is the provision of such a device, the parts of which can be quickly and easily assembled and taken apart, which has its parts of light and simple construction, so that the device can be readily handled and carried about, and in order that the parts can be thoroughly and readily cleaned, and which has other advantages that render the device practical.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein the figure is a median vertical section of the cooker.

In carrying out the invention there is provided a base or bottom which is stamped from a circular blank of sheet metal, and is provided with a marginal trough 1 having the outer and inner walls 2 and 3 respectively. The edge of the outer wall or flange 2 has an outturned bead 4 to stiffen it, and to also afford means for securing the parts of the casing together. This base is further provided within the trough with a pan or receptacle 5 having the upturned rim 6 integral with the inner wall 3, said pan constituting the central portion of the sheet metal plate which is depressed within the trough with the bottom of the pan spaced above the bottom of the trough so as to provide a dead air space below the pan. This pan is adapted to receive any suitable heat radiator 7, such as is commonly used in fireless cookers, and the radiator will thus be supported a distance above the lower surface of the base or trough 1 thereof. This avoids the possibility of burning or scorching the table, floor or other surface on which the cooker is placed, inasmuch as the radiator is raised and removed from such surface, and the base is preferably composed of a metal or material which is a poor conductor of heat.

A bell-shaped hood 8 is provided to seat on the base, the upper end thereof being closed and the lower open, and the lower end of the hood is adapted to seat snugly within the trough 1 so as to "seal" the casing. This hood is composed of double walls filled with insulation 9 of any suitable material, to prevent heat from penetrating the hood, and the hood can have suitable handles 10 for lifting and carrying either the hood or the entire device. This hood is placed over the base after the cooking vessels are placed on the radiator 7, as seen in the drawing, thereby inclosing said vessels and radiator, it being a simple matter to first place the radiator on the base, the vessels on the radiator, and then the hood over the vessels on the base.

In order to secure the hood on the base, snap hooks 11 are pivoted as at 12, to the hood 8 near the lower end thereof, so as to be disposed over the bead 4, and the outer wall 2 of the trough has openings 13 under said bead, in order that the hooks can snap under the bead 4 and into the openings 13 to bear against the hood 8 and thus latch the hood and base together, and the tension serves to hold the hood tightly in the trough 1 as well as enabling the base and parts supported thereon to be lifted with the hood.

To remove the hood the hooks or latches 11 are pulled or snapped out of engagement with the bead.

The raised portion of the base extends upwardly within the hood, thereby supporting the radiator well up within the hood, to retain the heat therein, and thus lessen the tendency for the escape of heat from beneath the radiator.

The hood is of plain construction, so that it can be readily cleaned out, and there are no crevices or recesses in which dirt or foreign matter can accumulate. The base being cut from a single sheet of metal can be inexpensively manufactured, can also be easily cleaned, and is not apt to become insanitary.

Having thus described the invention, what is claimed as new is:—

1. A device of the character described embodying a base, a hood, said base having a trough to receive the lower end of the hood and provided with outer and inner walls, and also having a raised pan within the trough having its rim integral with and its bottom depressed from the inner wall of the trough for supporting a radiator, and latches carried by the hood, said outer wall having a bead and portions below the bead for the engagement of the latches.

2. A device of the character described embodying a base having an outer wall, a hood to seat on the base within said wall, said wall having a bead and openings below the bead, and latch hooks pivoted to the hood to engage under said bead within said openings.

3. A device of the character described embodying a base having a trough with outer and inner walls, and a radiator supporting pan within and carried by the inner wall, a hood whose lower end is seatable snugly in said trough, said outer wall having a bead and openings below the bead, and latch hooks pivoted to the hood to snap under said bead within the openings.

In testimony whereof I have signed my name to this specification in the presence of two subscribing witnesses.

JOHN L. SNIDER.

Witnesses:
G. E. SNIDER,
J. O. GARNER.